United States Patent
Bach

(10) Patent No.: US 8,783,763 B1
(45) Date of Patent: Jul. 22, 2014

(54) VEHICLE ROOF STRUCTURE

(71) Applicant: Honda Motor Co., Ltd., Tokyo (JP)

(72) Inventor: Edward Bach, Galloway, OH (US)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 13/803,839

(22) Filed: Mar. 14, 2013

(51) Int. Cl.
*B60R 25/06* (2006.01)
*B62D 65/02* (2006.01)
*B62D 25/06* (2006.01)

(52) U.S. Cl.
CPC ............... *B62D 25/06* (2013.01); *B62D 65/02* (2013.01)
USPC ..................................... 296/210; 296/203.03

(58) Field of Classification Search
USPC ................. 296/210, 203.03, 29, 30
See application file for complete search history.

(56) References Cited

U.S. PATENT DOCUMENTS

| | | | |
|---|---|---|---|
| 4,444,428 A | 4/1984 | Iwakura et al. | |
| 4,618,181 A * | 10/1986 | Tokuda et al. | 296/191 |
| 6,126,232 A | 10/2000 | Nakano | |
| 6,283,541 B1 * | 9/2001 | Kim | 296/210 |
| 6,578,909 B1 | 6/2003 | Reed et al. | |
| 7,080,876 B2 * | 7/2006 | Ido et al. | 296/210 |
| 7,213,874 B2 | 5/2007 | Osterberg et al. | |
| 7,695,038 B2 | 4/2010 | Harberts et al. | |
| 7,997,643 B2 * | 8/2011 | Shah et al. | 296/210 |
| 2008/0178467 A1 | 7/2008 | Hayashi et al. | |
| 2009/0174228 A1 | 7/2009 | Duguet et al. | |
| 2012/0061998 A1 | 3/2012 | Carsley et al. | |

* cited by examiner

*Primary Examiner* — Pinel Romain
(74) *Attorney, Agent, or Firm* — Rankin, Hill & Clark LLP

(57) ABSTRACT

A vehicle roof structure includes a vehicle body and a vehicle roof. The vehicle body includes an outer side panel, a body stiffener and an inner side panel. The vehicle roof includes a roof panel and a roof stiffener. A connection portion between the vehicle body and vehicle roof forms a roof ditch which extends along a longitudinal direction of the vehicle roof structure. The roof ditch includes a bottom which extends laterally between the vehicle body and vehicle roof. Structural welds associated only with the vehicle body and separate attachment welds only connecting the vehicle roof to the vehicle body are provided on the bottom of the roof ditch. The two welds allow multiple sheets of material to be applied in the roof ditch for crash regulations.

20 Claims, 4 Drawing Sheets

VEHICLE ROOF STRUCTURE

BACKGROUND

A typical white body includes a steel body structure having a side body panel and a steel roof panel that are joined together at the bottom of a flange structure extending along the mating edges of the roof panel and the side body panel. This flange structure creates a roof ditch area, which is defined by the connection of the side body panel and the roof panel and extends along the longitudinal direction of the vehicle roof. The roof ditch is only wide enough for one row of welds. This one row of welds attaches the side panel to a stiffener and an inner panel, and also attaches the roof panel to the side panel and one of the stiffener and the inner panel. With this construction, one of the stiffener and the inner panel is trimmed away to avoid a four-metal thickness weld. Some vehicle manufacturers also apply a laser weld between the roof panel and the side panel outer. With the current crash requirements, layering of multiple sheets have become more common, and with the additional layers of sheet metal in the roof ditch area, there can be four to seven sheets of steel. However, the weld strength cannot be guaranteed through four sheets or thicker. Further, the application of high strength steel makes welding more difficult. With press hardened steel applied in the roof ditch area for crash regulations and four sheets of steel material, one of the sheets needs to be removed for a quality weld. If the press hardened steel is trimmed back, there could be a reduction in crash performance.

BRIEF DESCRIPTION

In accordance with one aspect, a vehicle roof structure comprises a vehicle body and a vehicle roof. The vehicle body includes an outer side panel, a body stiffener and an inner side panel. The vehicle roof includes a roof panel and a roof stiffener. A connection portion between the vehicle body and vehicle roof forms a roof ditch which extends along a longitudinal direction of the vehicle roof structure. The roof ditch includes a bottom which extends laterally between the vehicle body and vehicle roof. Structural welds associated only with the vehicle body and separate attachment welds only connecting the vehicle roof to the vehicle body are provided on the bottom of the roof ditch. The two separate welds located in the roof ditch allow multiple sheets of material to be applied in the roof ditch for crash regulations without the need to trim any respective component of the vehicle body and vehicle roof.

In accordance with another aspect, a vehicle roof structure comprises a vehicle body and a vehicle roof. The vehicle body includes an outer side panel, a body stiffener and an inner side panel. The vehicle roof includes a roof panel and a roof stiffener. A connection portion between the vehicle body and vehicle roof forms a roof ditch which extends along a longitudinal direction of the vehicle roof structure. The roof ditch includes a bottom which extends laterally between the vehicle body and vehicle roof. A structural row of welds associated only with the vehicle body and a separate attachment row of welds for only connecting the vehicle roof to the vehicle body are provided on the bottom of the roof ditch. The structural row of welds is a three-metal thickness weld only between respective overlapping end portions of the outer side panel, a body stiffener and an inner side panel.

In accordance with yet another aspect, a method of assembling a vehicle roof structure is provided. The method comprises forming a roof ditch in a connection portion between a vehicle body and a vehicle roof, the vehicle body including an outer side panel, a body stiffener and an inner side panel, the vehicle roof including a roof panel and a roof stiffener; providing structural welds in the roof ditch by welding only respective end portions of the outer side panel, body stiffener and inner side panel in the roof ditch; and providing attachment welds in the roof ditch which are separate from the structural welds by welding an end portion of the roof panel and the end portion of the outer side panel.

DETAILED DESCRIPTION

It should be understood that the description and drawings herein are merely illustrative and that various modifications and changes can be made in the structures disclosed without departing from the present disclosure. In general, the figures of the exemplary vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle roof structure disclosed herein are merely terms of art that may vary from one manufacturer to another and should not be deemed to limit the present disclosure.

Figure 1:
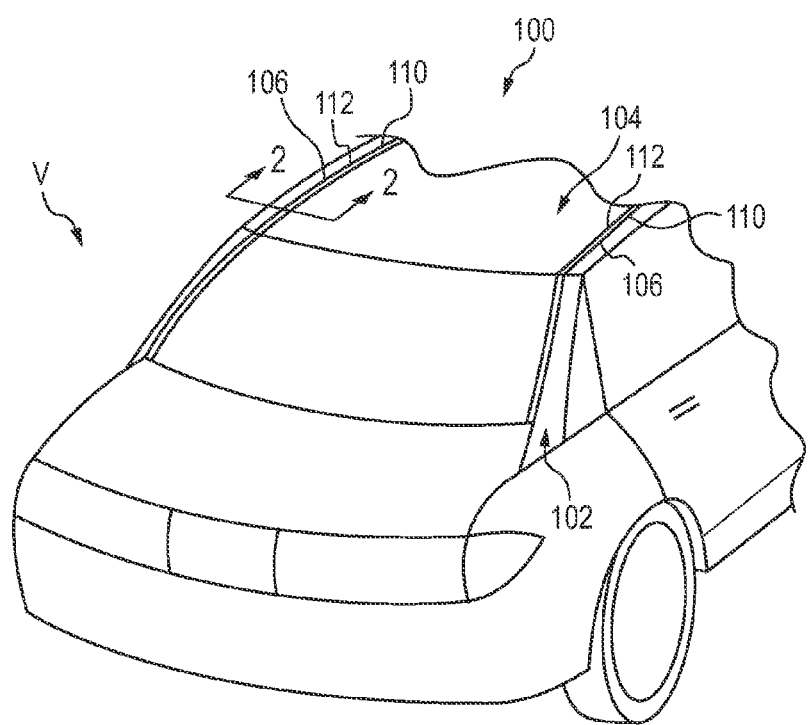
FIG. 1 is a perspective view of a vehicle including a known roof structure with a connection portion between a vehicle body and a vehicle roof forming a roof ditch which extends along a longitudinal direction of the vehicle roof structure.

Referring now to the drawings, wherein like numerals refer to like parts throughout the several views, FIG. 1 is a perspective view of a vehicle V having a known roof structure 100. As is well known, the roof structure 100 is defined by a vehicle body 102 and a vehicle roof 104 secured to the vehicle body. A connection portion 106 between the vehicle body 102 and vehicle roof 104 forms a pair of laterally spaced roof grooves or ditches 110 which extend along a longitudinal direction of the vehicle roof structure 100. The roof structure 100 further includes a pair of elongated side or roof moldings 112 attached in the pair of roof ditches 110. In FIG. 1, the left and right roof ditches 110 of the roof structure 100 may be identically constructed, but for their disposition on opposite sides of the vehicle V. To simplify the explanation of the present disclosure, only the roof ditch 110 provided along the left side of the roof structure 100 will be discussed, but it should be understood that the same construction could be used for the right side of the vehicle.

Figure 2:
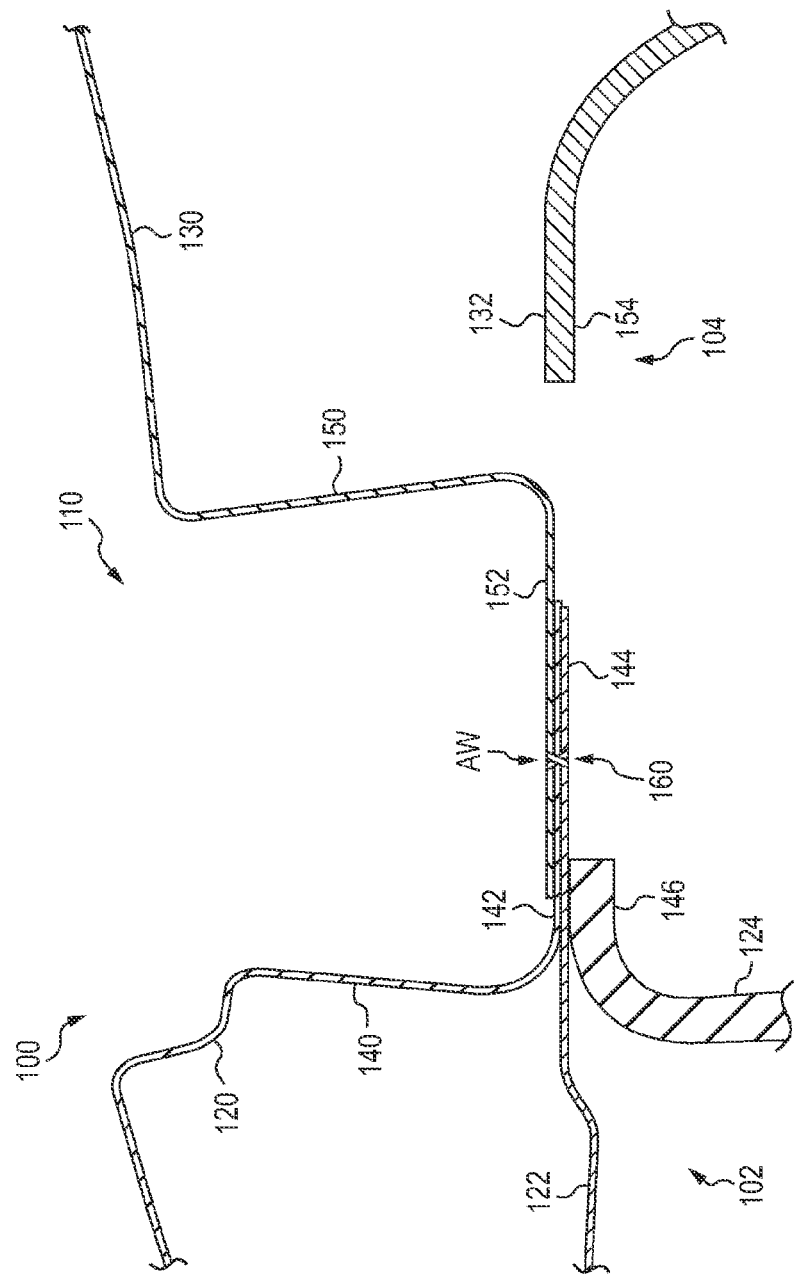
FIG. 2 is a cross-sectional view of the roof structure of FIG. 1 taken along line 2-2 of FIG. 1.

FIG. 2 is a cross-section view of the roof structure 100 taken along the cross-sectional line of FIG. 1. As shown in FIG. 2, the vehicle body 102 includes an outer side panel 120, a body stiffener 122 and an inner side panel 124. The vehicle roof includes a roof panel 130 and a roof stiffener 132. The outer side panel 120 has a flange structure including a vertical wall 140 and an end portion or horizontal wall 142. Each of the body stiffener 122 and inner side panel 124 includes a respective end portion 144, 146 which extends at least partially into the roof ditch 110. The roof panel 130 also has a flange structure including a vertical wall 150 and an end portion or horizontal wall 152. The roof stiffener 132 includes an end portion 154 which extends toward the roof ditch 110. The horizontal walls 142 and 152 of the respective outer side panel 120 and roof panel 130 together with the end portion 144 of the stiffener 122 overlap with one another in the roof ditch and can be welded together by a series of electric resistance spot welds W that are provided along the length of the outer side panel 120 and roof panel 130. As depicted, the roof ditch 110 of FIG. 2 is only wide enough for one row of welds W. With this known construction of the vehicle roof structure 100, the respective end portions 146, 154 of the inner side panel 124 and the roof stiffener 132 are trimmed away from the overlapping section 160 of the roof ditch 110 to avoid a four-metal thickness weld between the vehicle body 102 and roof panel 104.

Figure 3:
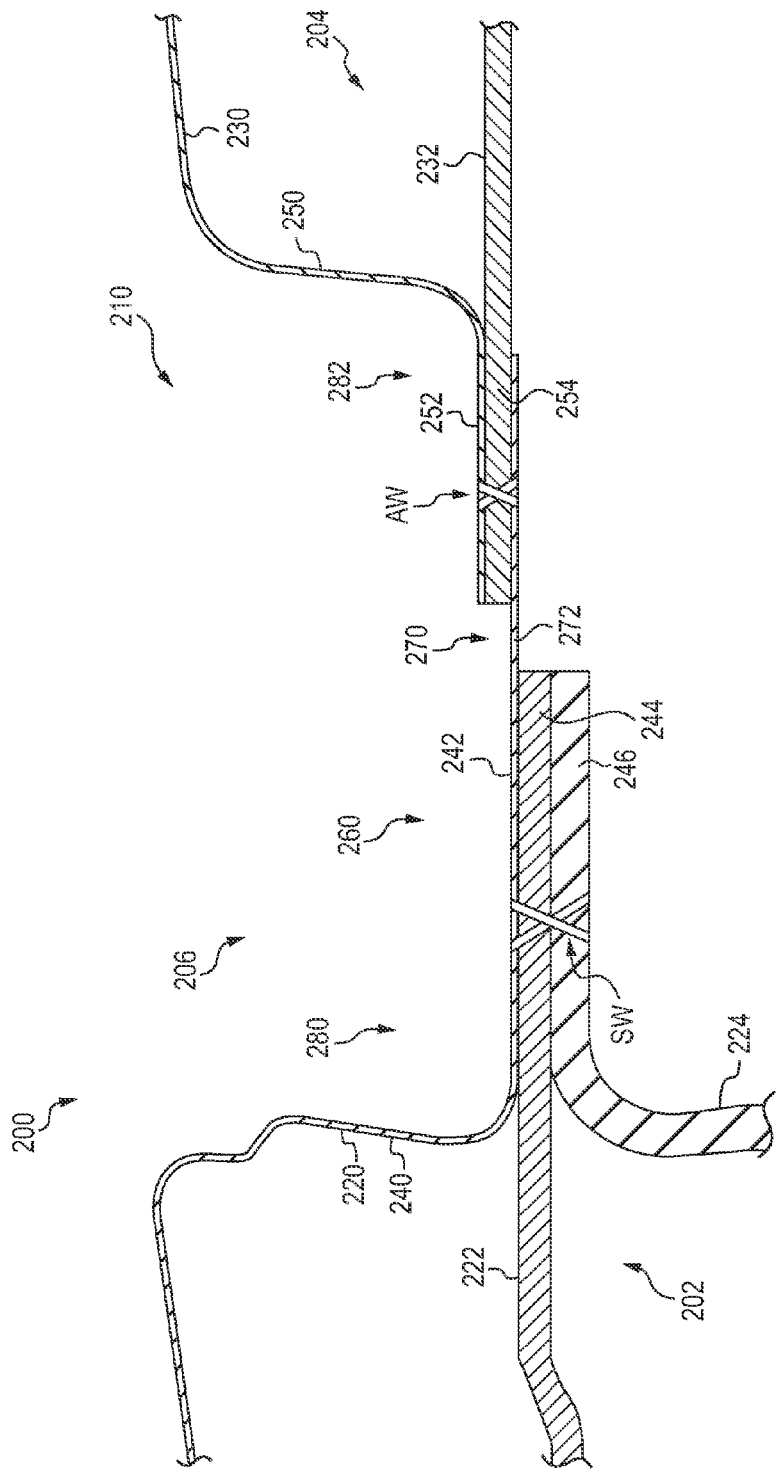
FIG. 3 is a cross-sectional view similar to FIG. 2 showing a roof structure according to one aspect of the present disclosure.

With reference to FIG. 3, which is a cross-section view of a vehicle roof structure 200 according to one aspect of the present disclosure taken along a cross-sectional line similar to cross-sectional line 2-2 of FIG. 1, the exemplary roof structure 200 is again defined by a vehicle body 202 and a vehicle roof 204 secured to the vehicle body. A connection portion 206 between the vehicle body 202 and vehicle roof 204 forms a pair of laterally spaced roof grooves or ditches (only the roof ditch 210 located on the left side of the vehicle is depicted) which extends along a longitudinal direction of the vehicle roof structure 200. The vehicle body 202 includes an outer side panel 220, a body stiffener 222 and an inner side panel 224. The vehicle roof 204 includes a roof panel 230 and a roof stiffener 232. Similar to the roof structure 100, the outer side panel 220 has a flange structure including a vertical wall 240 and an end portion or horizontal wall 242. Each of the body stiffener 222 and inner side panel 224 includes a respective end portion 244, 246. The roof panel 230 also has a flange structure including a vertical wall 250 and an end portion or horizontal wall 252. The roof stiffener 232 includes an end portion 254.

To avoid trimming the inner side panel and the roof stiffener, the present disclosure provides a second row of welds in the roof ditch 210. As depicted, the exemplary roof ditch 210 of FIG. 3 is widened to accommodate two separate rows of welds. More particularly, the roof ditch 210 includes a bottom 260 which extends laterally between the vehicle body 202 and vehicle roof 204. Structural welds SW, which are typically aligned in a row, associated only with the vehicle body 102 and separate attachment welds AW, which are also typically aligned in a row, only connecting the vehicle roof 204 to the vehicle body 202 are provided on the bottom 260 of the roof ditch 210. The two separate welds or rows of welds SW and AW located in the roof ditch 210 allow multiple sheets of material to be applied in the roof ditch for crash regulations without the need to trim any respective component of the vehicle body and vehicle roof. Thus, in contrast to vehicle roof structure 100 of FIG. 2, the respective end portions 244, 254 of the body stiffener 222 and roof stiffener 232 at least partially define the bottom 260 of the roof ditch 210 and are laterally spaced from one another in the roof ditch. The exemplary roof structure 200 also allows all structural welds SW to be in one line and all of the roof attachment welds AW to be in a separate line (i.e., the structural row of welds extends parallel to the separate attachment row of welds on the bottom 160 of the roof ditch 110), without having to trim back multiple sheets to produce a quality weld.

As shown in FIG. 3, the structural row of welds SW is a three-metal thickness weld only between respective overlapping end portions 242, 244, 246 of the outer side panel 220, body stiffener 222 and an inner side panel 224. The end portion 242 of the outer side panel 220 extends substantially the entire bottom 260 of the roof ditch 210 and is located beneath the end portion 252 of the roof panel 230. The respective end portions 244, 246 of the body stiffener 222 and inner side panel 224 are laterally spaced from the end portion 252 of the roof panel. Thus, the overlapping end portions 242, 244, 246 define a first reinforced section of the roof ditch 210.

According to one aspect of the exemplary vehicle roof structure 200, and as depicted in FIG. 3, the attachment row of welds AW is a three-metal thickness weld only between the end portion 242 of the outer side panel 230 and respective end portions 252, 254 of the roof panel 230 and roof stiffener 232. With this construction, the end portion 242 of the outer side panel 220 is located beneath the respective end portions 252, 254 of the roof panel and roof stiffener, and the respective end portions 252, 254 of the roof panel 230 and roof stiffener 232 are laterally spaced from the respective end portions 244, 246 of the body stiffener 222 and inner side panel 224. Still further, according to this aspect, a portion 270 of the bottom 260 of the roof ditch 210 is only defined by a section 272 of the end portion 242 of the outer side panel 220. This section 272 of the outer side panel bridges the respective end portions 244, 246 of the body stiffener 222 and inner side panel 224 and the respective end portions 252, 254 of the roof panel 230 and roof stiffener 232. Thus, the overlapping end portions 242, 252, 254 define a second reinforced section of the roof ditch 210. With the three-metal thickness welds for both the structural row of welds SW and the attachment row of welds AW, the bottom 260 of the roof ditch 210 is separated into a first section 280 and a second section 282. The first section 280 is defined only by the respective end portions 242, 244, 246 of outer side panel 220, body stiffener 222 and inner side panel 224. The second portion 282 is defined only by respective end portions 252, 254, 242 of the roof panel 230, roof stiffener 232 and outer side panel 220.

Figure 4:
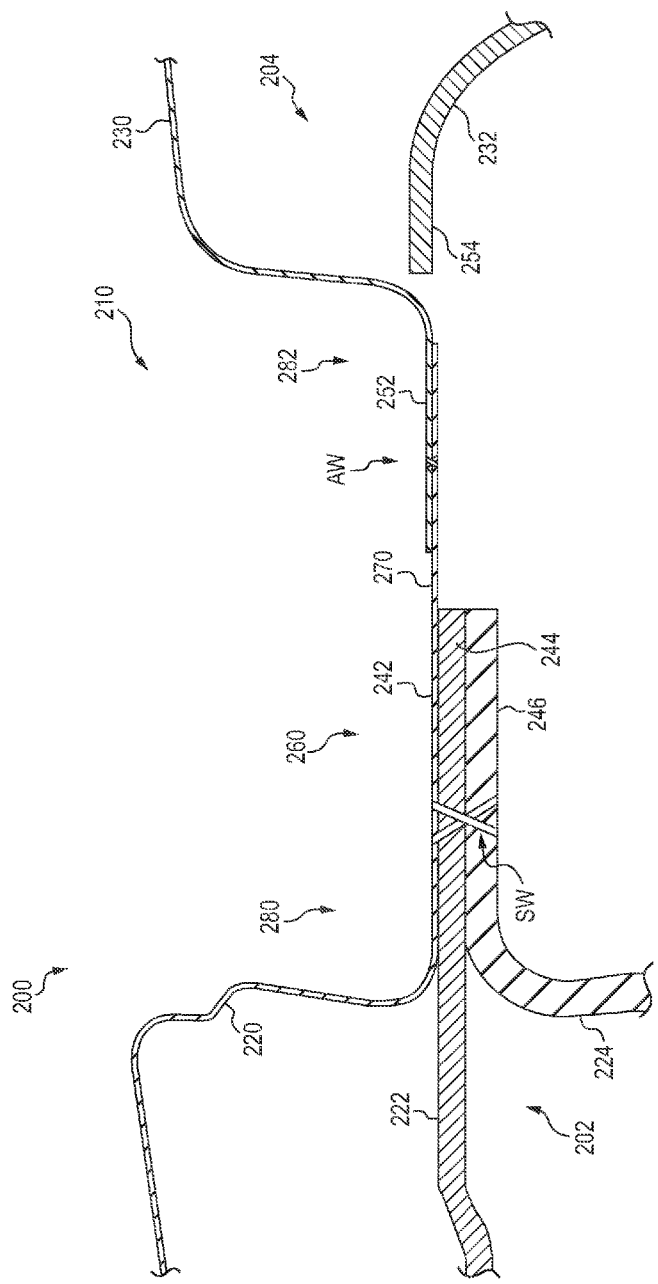
FIG. 4 is a cross-sectional view similar to FIG. 2 showing a roof structure according to another aspect of the present disclosure.

With reference to FIG. 4 (which is also a cross-section view of the vehicle roof structure 200 taken along a cross-sectional line similar to cross-sectional line 2-2 of FIG. 1), and according to another aspect of the exemplary vehicle roof structure 200, the attachment row of welds AW is a two-metal thickness weld only between the end portion 242 of the outer side panel 220 and the end portion 252 of the roof panel 230. As shown, the end portion 242 of the outer side panel 220 is located beneath the end portion 252 of the roof panel 230, and the end portion 252 of the roof panel is laterally spaced from the respective end portions 244, 246 of the body stiffener 222 and inner side panel 224. Similar to the aspect shown in FIG. 3, the section 270 of the bottom 260 bridges the respective end portions 244, 246 of the body stiffener 222 and inner side panel 224 and the end portion 252 of the roof panel 230. Further, the first section 280 is defined only by the respective end portions 242, 244, 246 of outer side panel 220, body stiffener 222 and inner side panel 224, and the second portion 282 is defined only by respective end portions 252, 242 of the roof panel 230 and outer side panel 220.

The present disclosure further provides a method of assembling the vehicle roof structure 200. The method generally comprises forming the roof ditch 210 in the connection portion 206 between the vehicle body 202 and the vehicle roof 204; providing the structural welds SW in the roof ditch 210 by welding only the respective end portions of the outer side panel 220, body stiffener 222 and inner side panel 224 in the roof ditch; and providing the attachment welds AW in the roof ditch 210 which are separate from the structural welds SW by welding the end portion of the roof panel 230 and the end portion of the outer side panel 220. As indicated previously, and as shown in FIG. 3, the attachment welds can be a three-metal thickness weld only between the end portion 242 of the outer side panel 220 and respective end portions 252, 254 of the roof panel 230 and roof stiffener 232. With this aspect, the method further includes separating the roof ditch into the first section 280 and the second section 282. The first section 280 is formed of the respective end portions 242, 244, 246 of the outer side panel 220, body stiffener 222 and inner side panel 224. The second section 282 is formed of the respective end portions 242, 252, 254 of the outer side panel 220, roof panel 230 and roof stiffener 232. As shown in FIG. 4, the attachment welds can be a two-metal thickness weld only between the end portion 242 of the outer side panel 220 and the end portion 252 of the roof panel 230. According to this aspect, the method further includes laterally spacing the overlapping end portions of the body stiffener 222 and inner side panel 224 from the end portion of the roof panel 230 such that a section of the roof ditch 210 is defined by only the end portion 242 of the outer side panel 220.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle roof structure comprising:
 a vehicle body including an outer side panel, a body stiffener and an inner side panel; and
 a vehicle roof including a roof panel and a roof stiffener, a connection portion between the vehicle body and vehicle roof forms a roof ditch which extends along a longitudinal direction of the vehicle roof structure, wherein the roof ditch includes a bottom which extends laterally between the vehicle body and vehicle roof, and provided on the bottom of the roof ditch is structural welds associated only with the vehicle body and separate attachment welds only connecting the vehicle roof to the vehicle body, wherein the two separate welds located in the roof ditch allow multiple sheets of material to be applied in the roof ditch for crash regulations without the need to trim any respective component of the vehicle body and vehicle roof.

2. The vehicle roof structure of claim 1, wherein the structural welds are a three-metal thickness weld only between respective end portions of the outer side panel, the body stiffener and an inner side panel.

3. The vehicle roof structure of claim 2, wherein the end portion of the outer side panel extends substantially the entire bottom of the roof ditch and is located beneath an end portion of the roof panel, and the respective end portions of the body stiffener and inner side panel are laterally spaced from the end portion of the roof panel.

4. The vehicle roof structure of claim 2, wherein the attachment weld are a two-metal thickness weld only between the end portion of the outer side panel and an end portion of the roof panel.

5. The vehicle roof structure of claim 4, wherein the end portion of the outer side panel is located beneath the end portion of the roof panel, and the end portion of the roof panel is laterally spaced from the respective end portions of the body stiffener and inner side panel.

6. The vehicle roof structure of claim 2, wherein the attachment welds are a three-metal thickness weld only between the end portion of the outer side panel and respective end portions of the roof panel and roof stiffener.

7. The vehicle roof structure of claim 6, wherein the end portion of the outer side panel is located beneath the respective end portions of the roof panel and roof stiffener, and the respective end portions of the roof panel and roof stiffener are laterally spaced from the respective end portions of the body stiffener and inner side panel.

8. The vehicle roof structure of claim 7, wherein a portion of the bottom of the roof ditch is only defined by a section of the end portion of the outer side panel bridging the respective end portions of the body stiffener and inner side panel and the respective end portions of the roof panel and roof stiffener.

9. The vehicle roof structure of claim 1, wherein the structural welds extend parallel to the separate attachment welds on the bottom of the roof ditch.

10. The vehicle roof structure of claim 1, wherein the respective end portions of the body stiffener and roof stiffener at least partially define the bottom of the roof ditch and are laterally spaced from one another in the roof ditch.

11. A vehicle roof structure comprising:
 a vehicle body including an outer side panel, a body stiffener and an inner side panel; and
 a vehicle roof including a roof panel and a roof stiffener, a connection portion between the vehicle body and vehicle roof forms a roof ditch which extends along a longitudinal direction of the vehicle roof structure, wherein the roof ditch includes a bottom which extends laterally between the vehicle body and vehicle roof, and provided on the bottom of the roof ditch is a structural row of welds associated only with the vehicle body and a separate attachment row of welds for only connecting the vehicle roof to the vehicle body, wherein the structural row of welds is a three-metal thickness weld only between respective overlapping end portions of the outer side panel, the body stiffener and an inner side panel.

12. The vehicle body of claim 11, wherein the attachment row of welds is a two-metal thickness weld only between the end portion of the outer side panel and an end portion of the roof panel.

13. The vehicle roof structure of claim 11, wherein the attachment row of welds is a three-metal thickness weld only between the end portion of the outer side panel and respective end portions of the roof panel and roof stiffener.

14. The vehicle roof structure of claim 13, wherein the bottom of the roof ditch is separated into a first section and a second section, the first section being defined only by the respective end portions of the outer side panel, body stiffener and inner side panel, and the second portion being defined only by respective end portions of the roof panel, roof stiffener and outer side panel.

15. The vehicle roof structure of claim 11, wherein the respective overlapping end portions of the body stiffener and inner side panel are laterally spaced from an end portion of the roof panel.

16. A method of assembling a vehicle roof structure comprising:
 forming a roof ditch in a connection portion between a vehicle body and a vehicle roof, the vehicle body including an outer side panel, a body stiffener and an inner side panel, the vehicle roof including a roof panel and a roof stiffener;
 providing structural welds in the roof ditch by welding only respective end portions of the outer side panel, body stiffener and inner side panel in the roof ditch; and providing attachment welds in the roof ditch which are separate from the structural welds by welding an end portion of the roof panel and the end portion of the outer side panel.

17. The method of claim 16, wherein the attachment welds are a three-metal thickness weld only between the end portion of the outer side panel and respective end portions of the roof panel and roof stiffener.

18. The method of claim 17, further including separating the roof ditch into a first section and a second section, the first section formed of the respective end portions of the outer side panel, body stiffener and inner side panel, the second section formed of the respective end portions of the outer side panel, roof panel and roof stiffener.

19. The method of claim 16, wherein the attachment welds are a two-metal thickness weld only between the end portion of the outer side panel and the end portion of the roof panel.

20. The method of claim 16, further including laterally spacing the overlapping end portions of the body stiffener and inner side panel from the end portion of the roof panel such that a section of the roof ditch is defined by only the end portion of the outer side panel.

\* \* \* \* \*